United States Patent [19]
Hinderks

[11] 3,879,895
[45] Apr. 29, 1975

[54] CLOSURE MEMBER AND PROTECTOR
[76] Inventor: Mitja Victor Hinderks, 15a Adamson Rd., London, England
[22] Filed: Mar. 30, 1973
[21] Appl. No.: 346,299

[30] Foreign Application Priority Data
Mar. 30, 1972 United Kingdom............ 15001/72

[52] U.S. Cl. ................................................ 49/462
[51] Int. Cl.............................................. B60j 5/00
[58] Field of Search ................ 49/460, 462; 16/86; 296/152; 292/1

[56] References Cited
UNITED STATES PATENTS
2,678,232  5/1954  Barry ..................................... 49/462

3,243,222  3/1966  Loughary et al...................... 49/460
3,280,510  10/1966  Vaux..................................... 49/462
3,576,338  4/1971  Horton............................. 49/462 X Primary Examiner—J. Karl Bell
Attorney, Agent, or Firm—Craig & Antonelli

[57] ABSTRACT

A closure member having at least one protective member which is positioned within the confines of the closure member when the latter is closed and is movable to a position beyond the confines of the closure member when the latter is opened in order to prevent the edges or surface of the closure member from striking an obstacle.

13 Claims, 10 Drawing Figures

PATENTED APR 29 1975  3,879,895

CLOSURE MEMBER AND PROTECTOR

The present invention relates to pivoted or hinged closure members such as latches, covers, doors or the like and is directed more particularly, although not exclusively, to motor vehicle doors.

The object of the invention is to protect the leading edges and/or external surfaces of such closure members when opened.

The present invention consists in a closure member having at least one protective member which is positioned within the confines of the closure member when the latter is closed and is movable to a position beyond the confines of the closure member when the latter is opened in order to prevent the edges or surface of the closure member from striking an obstacle.

Figure 1:
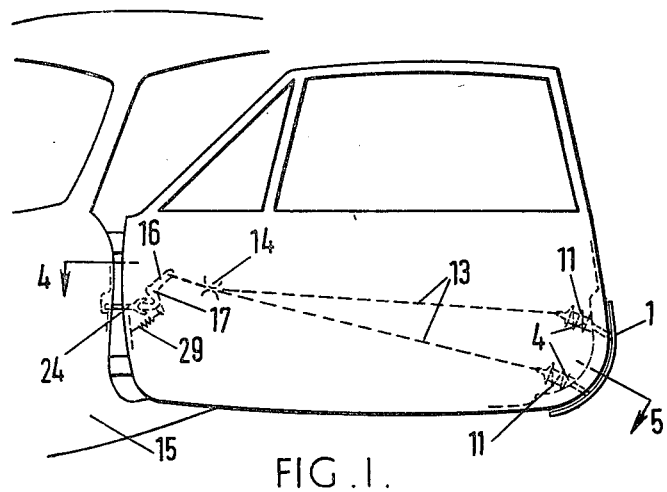
FIG. 1 is a general view of an opened vehicle door and protector member according to the present invention.

The preferred embodiment of the present invention comprises a rubber covered tube 1 of arcuate configuration flexibly mounted by means of strong rubber nipples 2 forced into the ends of curved tubular support arms 3, which slide inside similarly shaped guide tubes 4 fixed at 5 to a door structure 6, the arrangement allowing the tube 1 and support arms 3 to move from a recess 7 in the door 6 to a position clear of an edge 8 of the door. The end of each support arm 3 remote from the tube 1 is connected to a buffer washer 10, through either a concentric coil tension spring 11, or a plurality of smaller tension springs 12. The whole arrangement can be positioned to leave space for the window winding mechanism. The above assembly is connected to the vehicle body 15 by tension members 13 extending through guides 14 the members 13 being connected to one limb of a bell crank lever 16 mounted on a pivot 17 mounted at 18 to the door structure 6 and located by a circlip 19.

Figure 4:
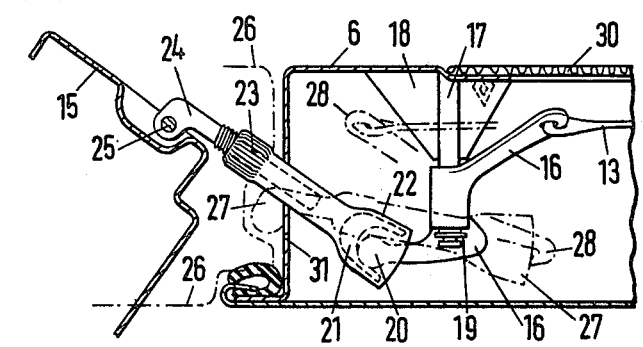
FIG. 4 is a detail section taken in the direction of arrow 4 of FIG. 1.

The other limbs of the lever 16 has a ball end 20 accommodated in a rubber 21 lined socket 22 of an adjustable operating rod 24 passing through an aperture 31 in the door and pivoting on a pin 25 fixed to the vehicle body 15, which is shown in FIG. 4 with the door open. Adjustment of the length of the rod 24 is effected by rotating the knurled portion 24. When the door is in its closed position as indicated by the numeral 26, the relative positions of the adjustable arm 27 and lever 28 are shown in chain-dotted outline. An optional tension spring 29 (FIG. 1) may locate the lever in the socket to prevent disconnection of the parts in the event of the bar striking an object. Maintenance and access to the mechanism is effected by removing the interior trim 30.

Figure 2:
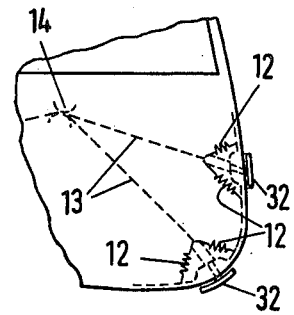
FIG. 2 is a part view of a door similar to FIG. 1, but showing an alternative arrangement.
Figure 3:
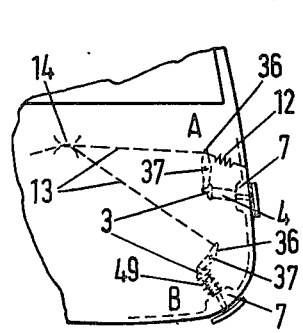
FIG. 3 is a part view of a door similar to FIG. 2 but showing a modified arrangement.
Figure 8:
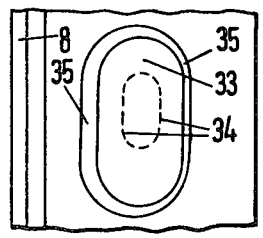
FIG. 8 is a part elevation similar to FIG. 7, but showing an alternative arrangement.

FIG. 2 shows part of a similar arrangement, except that protection is afforded by separate short bars or members 32. FIG. 8 shows a possible oval-shaped rubber covered head of one such member which may be mounted on an oval section support arm 34 slidably mounted in an oval tube, to ensure correct location in a recess 35. FIG. 3 shows how the protector members can be spring-urged into their respective recesses 7 and moved outwardly by cables 13 connected to levers 36 mounted on pivots 37 connected to the ends of the support arms 3, the other ends of the cables passing through a guide 14 and being connected directly to the vehicle body (not shown). At B a compression coil spring 49 is shown acting on the end of the concentric support arm, whilst at A a tension spring 12 is shown attached to the lever 36.

Figure 7:
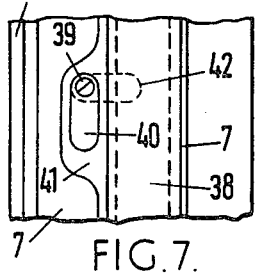
FIG. 7 is a part elevation showing an arrangement for retaining the protector member in its inoperative position.

FIG. 7 shows how, if the member 38 is spring loaded to move out of its recess 7, an adjustable clamp 40 which is positioned in its own recess 41 can be moved through 90° about a screw 39 to a position indicated by the numeral 42 to restrain the member 38 in its retracted position in the event of, say, cable breakage.

Figure 6:
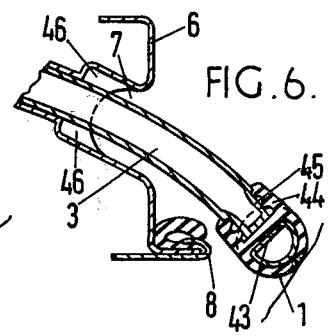
FIG. 6 is a section, similar to FIG. 5, but showing a modified arrangement.

FIG. 6 shows how, alternatively, the J shaped tube 1 may have at the points where it is flexibly joined to the support arms 3, both a deformation of the tube section 43 and a hollow serrated cut-shaped rubber projection 44 which resiliently engages over the correspondingly serrated end of the support arm 45, with an additional depression in the door recess 7 to accommodate this rubber fixing means.

Figure 9:
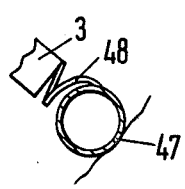
FIGS. 9 and 10 are sections showing details alternative to those of FIGS. 5 and 6.
Figure 10:
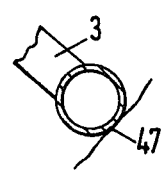

FIG. 9 shows a tubular bar 47 connected to the support arm by means of a spring 48, whilst FIG. 10 shows such a bar 47 fixed directly to the support arm.

Figure 5:
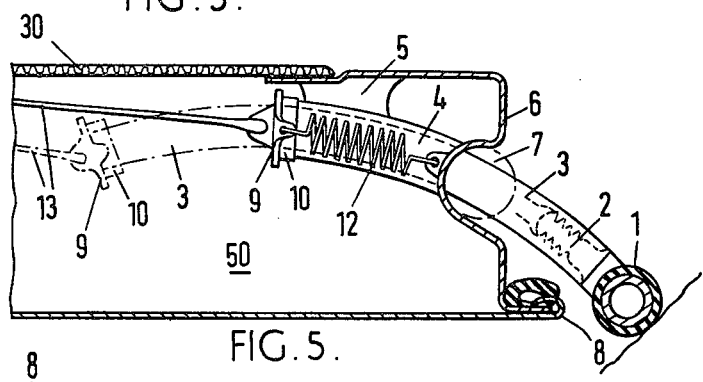
FIG. 5 is a detail section taken in the direction of arrow 5 of FIG. 1.

In operation, it is considered most practical to have the protective members spring-loaded outwardly so that any load incurred by the member or members striking an obstacle can be absorbed, at least to some degree, by the springing and not all transferred to the door. For the same reasons, the bar should be flexibly connected to the support arms, preferably in such a manner that the bar can separate under a high load, thereby preventing the bending and subsequent non-return of the support arms (shown in FIGS. 5 and 6). Because the bar will already be fully recessed, by being pulled against its spring, when the door is open slightly, a compressible cushion arrangement has to be incorporated in the linkage, and this is the object of the rubber insert 21 in the socket 22 of the arm as shown in FIG. 4, as well as a means for effecting accurate manual adjustment.

It is envisaged that the invention will first be incorporated into luxury cars which often have larger and heavier doors. For this purpose, especially if the vehicle is soft sprung and protection is to be afforded against the door fouling the curb when a heavy person enters the vehicle, the bar and support arms should be of metal, steel or aluminium, with the bar covered with an elastomeric or plastics material. If the invention is utilised in the cheaper, more likely-built cars, almost the entire assembly may be formed from a plastics material such as neoprene, which would have the two fold advantage of being more easily replaceable in the event of damage and, because it is itself flexible to some degree, would eliminate the need for a flexible fixing between the bar and support arm and the need to rubber-cover the tubular bar. If the protective members are to be in the form of projecting members they could consist of a rubber mushroom or T-shaped head, cast or snap-fixed onto the support arm.

I claim:

1. A container having a door assembly, said door assembly comprising two spaced panels interconnected by a peripheral flange, the door assembly being movable from a first closed position to a second open position, at least one protective member positioned exteriorly against said peripheral flange when the door assembly is in said first position, support means for supporting said protective member, said support means being slidably mounted by guide means defining a guide member, and actuating means for moving said protective member from an inoperative retracted position against said peripheral flange when the door assembly is in said first position to an operative protective position when the door assembly is in said second position.

2. A container as claimed in claim 1, wherein said support means are of substantially arcuate configuration.

3. A container as claimed in claim 1, wherein each protective member is accommodated in a recess of said peripheral flange.

4. A container as claimed in claim 1, wherein each protective member is moved outwardly beyond the confines of the door assembly by mechanical linkage.

5. A container as claimed in claim 4, wherein said linkage includes a tension member having one end connected to said support means and a second end operably connected to one arm of a pivotally mounted lever, said lever having a second arm connected by an operating rod to a fixed anchorage on the container.

6. A container as claimed in claim 5, wherein the length of said operating rod is manually adjustable.

7. A container as claimed in claim 6, wherein a resilient joint is interposed between said second arm of the lever and said operating rod.

8. A container as claimed in claim 1, wherein resilient means are provided to urge each protective member into said first position.

9. A container as claimed in claim 1, wherein resilient means are provided to urge each protective member into said second position.

10. A container as claimed in claim 9, wherein mechanical means are provided for rendering said resilient means inoperative and for holding each protective member substantially against said peripheral flange when in said first position.

11. A container as claimed in claim 1, wherein said support means are telescopingly guided inside said guide means, said guide means being mounted interiorly of said peripheral flange.

12. A container as claimed in claim 1, wherein said at least one protective member is a single elongated member having a shape corresponding to a portion of the peripheral edge of one of said two spaced panels.

13. A container as claimed in claim 1, wherein said protective member consists of a plurality of members spaced along a portion of the peripheral edge of one of said two spaced panels.

* * * * *